F. WIARD.
DRILL CHUCK.
APPLICATION FILED MAR. 25, 1911.

1,056,076.

Patented Mar. 18, 1913.

Witnesses
O. B. Baenziger.
S. G. Howlett.

Inventor
Frederick Wiard.
By E. S. Wheeler.
Attorney

UNITED STATES PATENT OFFICE.

FREDERICK WIARD, OF DETROIT, MICHIGAN.

DRILL-CHUCK.

1,056,076.      Specification of Letters Patent.      Patented Mar. 18, 1913.

Application filed March 25, 1911. Serial No. 616,811.

*To all whom it may concern:*

Be it known that I, FREDERICK WIARD, a citizen of the United States, residing at Detroit, in the county of Wayne, State of Michigan, have invented certain new and useful Improvements in Drill-Chucks; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to drill chucks, and consists in the construction and arrangement of parts hereinafter more fully set forth and pointed out particularly in the claims.

The object of the invention is to provide simple and efficient means for enabling an operator to readily effect a change of tools without stopping the machine; for effecting a secure and positive drive for the tool without undue wear on the driving parts; for obviating wabbling and enabling a tool to be at all times properly centered for close work, and for obviating the battering up of the spindle by the use of a drift pin and hammer, as commonly practiced.

The above object is attained by the structure illustrated in the accompanying drawings, in which:—

Figure 1:
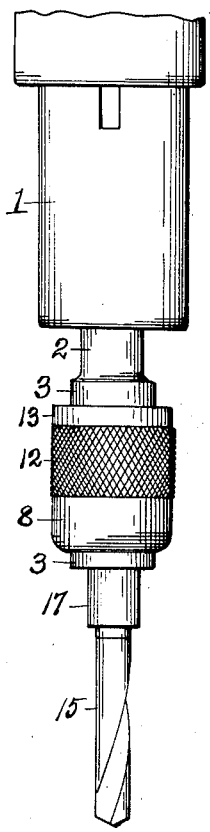
Figures 2, 3:
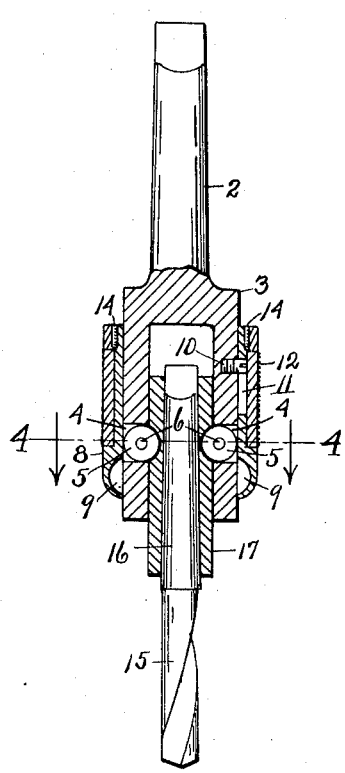
Figures 4, 5, 6:
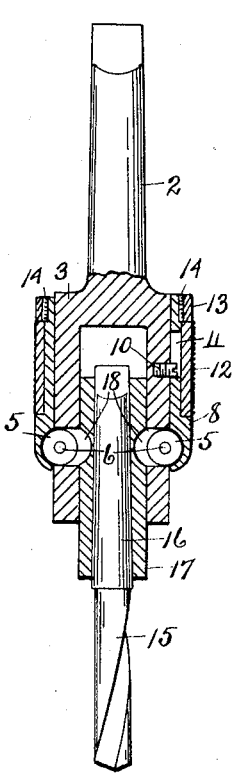

Figure 1 is an elevation showing my improved chuck in the socket of a spindle and a detachable collet in the chuck carrying the drill or tool. Fig. 2 is a sectional view showing the collet locked in the chuck. Fig. 3 is a similar view showing the collet unlocked and made free to drop from the chuck by the lifting of the locking sleeve. Fig. 4 is a transverse section, as on line 4—4 of Fig. 2. Fig. 5 is an elevation of the collet, the drill being broken away. Fig. 6 is an elevation of the chuck with its locking sleeve and rotatable collar removed.

Referring to the characters of reference, 1 designates the spindle of a drill or analogous machine into which is inserted in the usual manner the shank 2 of the socket 3. Formed in the wall of the socket are the opposed transverse apertures 4 in which are located the hardened steel locking disks 5. These disks are provided with axial trunnions 6, and formed in the side walls of the transverse apertures 4 are the channels 7 which extend inwardly from the periphery of the chuck but do not pass through the inner wall thereof. The disks are inserted in the apertures 4 from the outside with the trunnions 6 thereof lying in the channels 7, as clearly shown in Fig. 4, the bottoms of said channels forming abutments for said trunnions to prevent the disks passing through into the interior of the chuck, but allowing their peripheries to project thereinto, as shown.

Mounted upon the exterior of the chuck to reciprocate longitudinally is a sleeve 8. Formed in the inner wall of said sleeve at its lower end is a circular concavity 9 shaped to conform to and adapted to receive a portion of the periphery of the disks 5 when said sleeve is raised to the position shown in Fig. 3. The sleeve 8 is limited in its vertical movement on the chuck 3 by reason of a stop screw 10 (see Figs. 2 and 3), which is set into the chuck and lies in a vertical slot 11 in said sleeve, the length of which slot limits the vertical movement of the sleeve upon the chuck. The engagement of the screw in the slot of the sleeve 8 causes said sleeve to turn with the chuck. Upon the exterior of the sleeve 8 is a loose rotatable collar 12 formed preferably of brass and having a knurled surface. This collar is let into an annular recess in the sleeve and is held in place by a ring 13 which is slipped onto the reduced portion of the sleeve above said collar and is secured by screws 14 screwed into tapped apertures formed between the walls of the sleeve and ring. By this arrangement a loose collar upon the sleeve 8 is provided for within which said sleeve may turn as the chuck revolves, enabling the operator to readily grasp the sleeve when the chuck is in motion, for the purpose of raising it to release a tool, as hereinafter explained. A drill 15, or other tool, is detachably held within the socket by mounting upon the tapered tang or shank 16 thereof a collet 17 of slightly less diameter than the bore of the chuck. Formed in opposite sides of the collet 17 are the recesses 18 adapted to receive the peripheries of the disks 5 and having straight sides to be engaged by the sides of said disks.

To place a tool in the chuck, the sleeve 8 is raised to the position shown in Fig. 3, allowing the locking disks 5 to pass outwardly into the circular concavity 9 in the lower end of said sleeve, when the collet 17 carrying the tool to be used, may be freely inserted in the chuck. The arrangement of parts is such that when the collet is fully inserted in the chuck, the recesses 18 therein will register with the apertures 4 in the wall of the chuck in which the disks 5 lie so that upon releasing the sleeve 8 and allowing it to fall, said disks will be crowded inwardly into the recesses 18 in the collet and locked therein by the embracing wall of the sleeve, which, when in the lower position, as shown in Fig. 2, bears against the periphery of the locking disks, whereby the collet and its tool become securely locked in the chuck and will be caused to revolve therewith when the spindle is turned. To release a tool from the chuck, it is only necessary to raise the sleeve 8, thereby freeing the disks 5 and allowing them to move outwardly into the recess 9 in the sleeve as the released collet drops from the chuck by gravity. When in the locked position, as shown in Fig. 2, it is impossible to remove a tool from the drill without first raising the sleeve 8 to release the locking disks.

Because of the fact that the flat faces of the locking disks 5 engage the straight side walls of the recesses 18 in driving the collet, wear between said parts is obviated and excessive lost motion is overcome. This arrangement avoids any wedging strain against the locking disks and prevents them from being crowded outwardly against the resisting wall of the sleeve 8 which bears against their outer peripheries when the parts are in the locked position, as shown in Fig. 2.

Having thus fully set forth my invention, what I claim as new and desire to secure by Letters Patent, is:—

1. The combination of a chuck, a flat locking disk adapted to roll through a diametrical opening in said chuck having an engaging face, a collet insertible in the chuck having a recess therein adapted to receive said locking disk, said recess having a side adapted to be engaged by the engaging face of said disk, a sleeve slidable upon the chuck and rotatable therewith adapted to cooperate with said locking disk in the locking position to crowd it into the recess in said collet, and a loosely rotatable collar on said sleeve movable therewith but held against vertical movement thereon.

2. The combination of a chuck, a locking disk movable through the wall thereof having a straight engaging face, a collet insertible in the chuck having a recess therein adapted to receive said locking disk, said recess having a straight side parallel with the direction of movement of said disk through the wall of the chuck adapted to be engaged by the straight face of said disk, a sleeve slidable upon the chuck adapted to cooperate with said locking disk in the locked position to crowd it into the recess in said collet, and a collar rotatably mounted on said sleeve for manipulating it.

3. The combination of a chuck, a locking disk movable through the wall thereof, having a straight engaging face, a collet insertible in the chuck having a recess adapted to receive said locking disk, and having a straight side adapted to be engaged by the straight face of said disk, and a sleeve slidable upon said chuck, mainly of the same diameter of the chuck and adapted to cooperate with said locking member in the locked position to crowd it into the recess in said collet, said sleeve having at its lower end a circular recess to receive said locking disk when raised.

4. The combination of a chuck, having an opening in the wall thereof, a locking disk movable transversely of said opening having trunnions thereon projecting laterally in the plane of its axis, the side walls of the opening in the chuck having channels to receive said trunnions, a collet insertible in the chuck having a recess to receive said locking disk, and a sleeve slidable on the chuck cooperating with said disk to hold it locked in the recess of the collet.

In testimony whereof, I sign this specification in the presence of two witnesses.

FREDERICK WIARD.

Witnesses:
O. B. BAENZIGER,
I. G. HOWLETT.